United States Patent Office 2,761,213
Patented Sept. 4, 1956

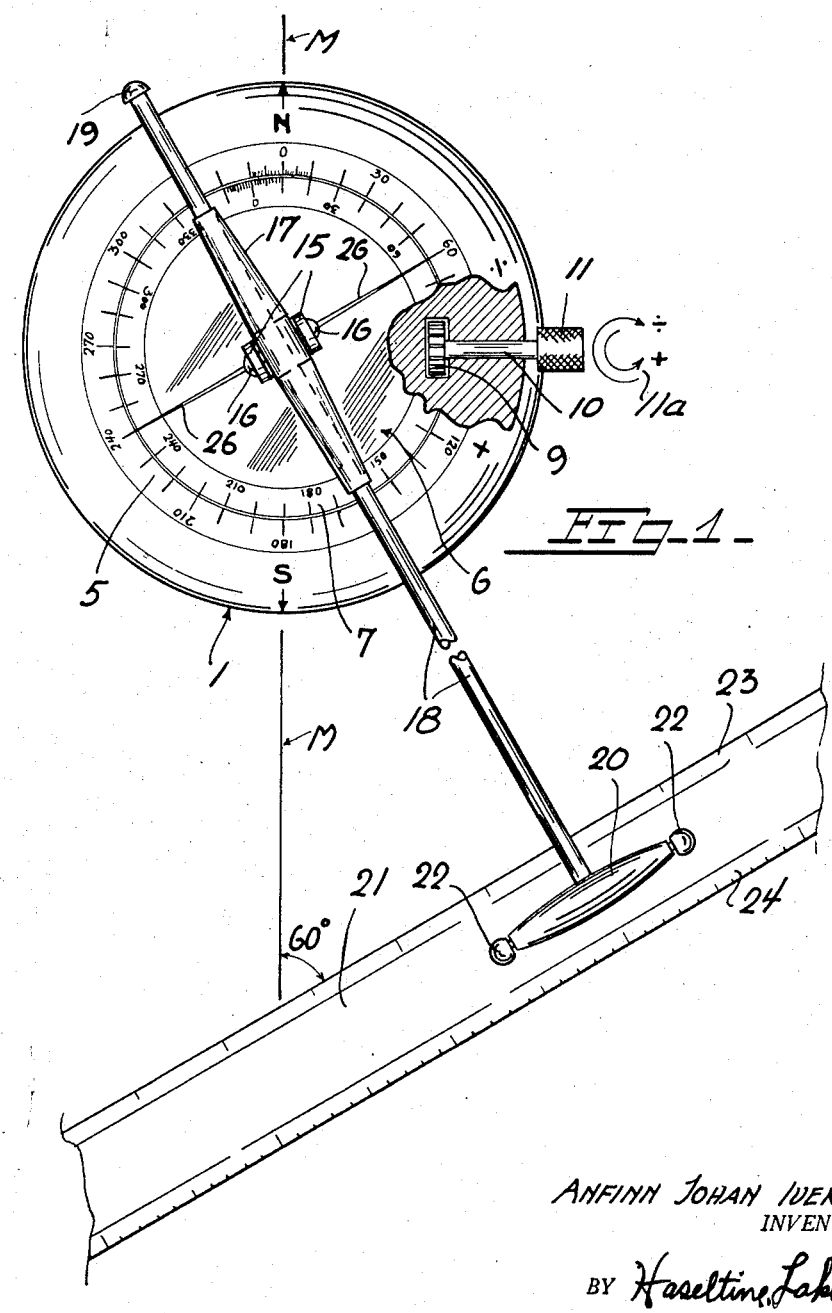

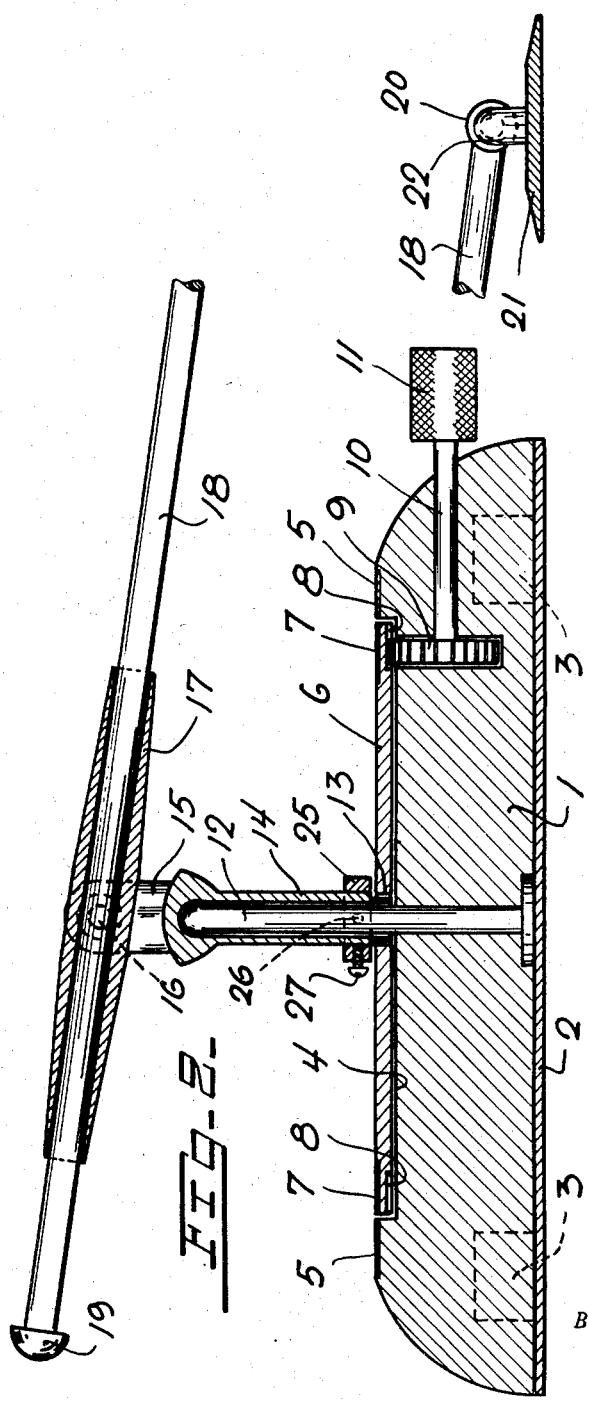

2,761,213

NAVIGATION INSTRUMENT

Anfinn Johan Iversen, Bergen, Norway

Application May 19, 1953, Serial No. 356,014

1 Claim. (Cl. 33—75)

The present invention relates to a navigation instrument by the means of which it is possible in a simple and accurate manner to compute and to plot upon a map the exact course to steer. The instrument is particularly suitable for that type of navigation which commonly is called "dead reckoning."

Known means for such type of navigation comprises a parallel ruler, a protractor and squares which are used to plot the magnetic (erroneous) compass course to steer upon the map from the rose, which is usually printed upon such maps, and thereafter to parallel transfer this plotted course from said rose to the last known position of the ship on the map. These known means have many disadvantages of which the following may be mentioned. During the parallel transfer of the parallel rulers or the squares on the map from the plotted course upon the rose to the last known position to find the new course to steer, or vice versa, it is easy for the navigator to make minor errors (parallax). Such errors may be multiplied when the navigation table is not at rest, for example on board a ship. Further the navigator must remember and calculate the declination, deviation and maybe also the drift of the ship, which also complicates the known methods as described.

In an already proposed form of navigation instrument the instrument has a graduated scale, the graduation of which corresponds to that of a compass rose and centrally within said scale a pivotally mounted needle carrying an arm the extreme end of which is connected to a ruler parallel to said needle. Said ruler may be arranged transportable parallel to and from said needle.

By adjusting the instrument scale in such a manner that its graduation registers with the graduation of the compass rose scale, which usually is printed upon all maps, the ruler may be adjusted to register with the course to be sailed. It is then the intention that the true or correct course to steer shall be shown by the position of the needle on the graduated instrument scale. There being no provisions to take into consideration declination, deviation or possible drift of the ship, the navigator must calculate these values and thereafter readjust the position of the needle upon the instrument scale to compensate for these variations and thus find the magnetic compass course to steer. This is of course a disadvantage in this known apparatus.

From compasses which work on the so-called "parallel principle" it is known to have compasses with two concentric graduated scales, of which one is adjustable in relation to the other. It is thus possible to calculate declination, deviation and drift and by readjusting one of said scales of the compass in relation to the other by the value computed, the magnetic course may be read directly upon the adjacent scale of the compass. It will however be understood that this device is not a navigation instrument in the true sense of the word.

The navigation instrument according to the invention overcomes these disadvantages of the known method and provides a self-contained apparatus by which the course may be plotted easily and which also has provision for the calculation of declination, deviation and possible drift and to actually show these.

The navigational instrument according to the invention comprises in combination a circular graduation arranged concentrically in or around a second circular graduation, a disk and a needle or pointer which co-operates with both said graduations and which is rotatably mounted centrally within said graduations, a parallel ruler carried at the end of an arm pivotally as well as axially displaceable in a carrier in such a manner that the said ruler may be displaced in a direction parallel to and from said needle pointer, and that one of said graduations is fixed to the instrument housing and the other of said graduations is provided with a rack with which meshes a gear rotatable by a knob from the outside of the housing.

One embodiment of the invention is illustrated by way of example in the accompanying drawings wherein:

Figure 1 is a plan view of a navigation instrument with a part of its housing cut away to show in horizontal section the adjustment means for the graduated disk and the course ruler adjusted to 60° from the meridian;

Figure 2 is a diametrical vertical section on an enlarged scale along the housing of the instrument through the adjustment means for the graduated disk and with the course ruler in this instance swung parallel to the meridian.

The reference number 1 indicates the instrument housing, the lower side of which is plane and may have a layer of felt 2. In the housing may be weights 3 to ensure that the instrument remains secured in position upon the map when in use.

In the top of the housing 1 there is a circular recess 4 along the edge of which there is a circular graduation 5, which preferably is from 0–360° as now used upon nautical maps, or there may be any other suitable graduation. Upon diametrically opposite sides the housing has two arrows N and S, which are oriented along the zero-axis of the instrument, also called the meridian-axis of the instrument, that is to say the imaginary line which, through the centre of the housing, follows the diameter 0–180° through the graduation 5. The arrow N indicates the zero point and the arrow S the 180° point of the graduation 5. Concentrically therewith in the recess 4 there is a rotatable disk 6 upon the upper side of which and along its edge is a second circular graduation 7 corresponding to the graduation 5 on the housing 1. On the underside of said disk 6 and along its edge there is a rack 8, which is adapted to cooperate with a gear 9 which is keyed to a shaft 10 having bearing in the housing 1. Said shaft 10 extends outside the housing 1 and being provided at its outer end with a knob 11. By turning this knob in either direction, the disk 6 is caused to rotate correspondingly, so that its graduation 7 may be adjusted to register with the graduation 5 upon the housing 1, in such a manner that the declination in the area in question, the deviation of the compass used, as well as possible drift of the ship may be calculated and taken into consideration when plotting the course upon the map as will be described hereinafter more in detail. As is common practice easterly declination is calculated to the left of zero upon the graduation 5 and is indicated by the sign ÷, while westerly declination is calculated to the right of said zero and is indicated by the sign +, which directions are indicated by the arrows 11a in Figure 1.

Concentrically in the housing 1 the recess 4 and the graduation 5 a pin 12 is fixed vertically upon the plane of the housing, which pin extends through a central hole 13 in the disk 6 to act as the pivot centre of the latter. Surrounding the pin 12 is a sleeve 14 the upper end of which is bifurcated at 15 to receive a short sleeve 17 which is pivotable in a vertical plane upon pins 16 in the bifurcation 15. In said sleeeve is received an arm 18 which fits closely therein so that the arm may be slid therethrough and kept in its adjusted position. In one end of the arm 18 is a head 19, which prevents the arm from being accidentally drawn out of the sleeve and at the opposite end of the arm is attached a transverse arm 20, each of the opposite ends of which is pivotally mounted in a knob 22 upon a ruler 21. By such arrangement the ruler will always lay flat upon the map independent of the inclination of the arm 18 in relation to said map. It will be seen that the arm 18 has a double bearing on the housing 1 because it may be swung through 360° in the plane of the housing as well as in a plane vertical to the housing.

The ruler 21 is preferably made of a transparent synthetic plastic material and has graduations 23 and 24 in one or more of the most used scales in which maps are drawn, so that the distances required can be immediately read from the ruler.

Upon the sleeve 14 immediately above the disk there is a ring 25 which carries two diametrically opposite needles or pointers 26. Said ring is attached to the sleeve 14 by means of a radial screw 27 so that the axis of the needles or pointers 26 may be adjusted parallel to the axis of the ruler 21.

For purposes of protection, the disk 6 and the graduation may be covered by a transparent plate of synthetic plastic material which along its edge may be screwed to the housing and have a central hole for the shaft 12 and the sleeve 14.

The instrument according to the invention may be used in the following manner: first the disk is adjusted by means of the adjusting members 8-11 so that its north-south axis viz its 0-180° axis registers with the zero-axis or N-S (north-south) axis of the housing 1.

(1) From the last known position the new true course line is drawn upon the map, which in the example shown in Figure 1 is 60° correct course. One edge of the ruler is adjusted along such course line and the housing 1 displaced along the map to the nearest available meridian M and adjusted so that its N-S axis registers with the meridian, as shown in Figure 1. The needle 26 pointing to the upper right hand corner of the drawing will thus show on the graduation 5 the correct compass course, which in the present example is 60°. When the navigator knows the declination, deviation and also the drift of the ship, the navigator calculates the deduction or addition with which the true compass course may be adjusted or corrected to find the magnetic compass course to steer. By means of the adjustment members 8-11 the graduated disk, 6, 7 is thereafter rotated this number of degrees west or east in relation to the N-S axis of the housing 1. The needle 26 will then show on the graduation 7 the magnetic compass course which should be steered. In the present instance shown the navigator has found that the declination, inclination and drift represent 10° west, that is to say in the negative direction, and the zero of the graduated disk 6, 7 is therefore adjusted to register with the 350° upon the graduation 5. The magnetic compass course which is to be steered is thus in the present example 70° as shown by the needle 26 upon the graduation 7.

(2) If a certain course is to be plotted upon the map the procedure is the reverse of those described in the foregoing example, that is to say the zero-axis of the housing 1 is orientated along the meridian M upon the map, the graduated disk 6, 7 adjusted by means of the adjusting device 8-11 to correct for declination, deviation and possible drift. In the present example these values have been calculated as 10° westerly (in the negative direction, so that the magnetic compass course can be directly read from the position of the needle 26) 70° upon the disk graduation 7, whereafter the course ruler 21 is displaced to the last known position upon the map. The ruler 21 will then register with the correct course direction 60° upon the map.

What I claim is:

A navigation instrument, comprising a rack carrying disc having a first fully graduated circular graduation, a housing having a second fully graduated circular graduation arranged concentrically around said first graduation and carrying register marks for registering with the meridian lines of a map, said first graduation and said second graduation being adjustable in relation to each other by rotation of said disc about the main centre of said graduations, a gear meshing with said disc rack and keyed to one end of a shaft rotatably supported by bearings in said housing, the other end of said shaft carrying a manipulating knob outside said housing, a double ended pointer cooperating with both said graduations and rotatably mounted in the main centre of said graduations, a carrier rigidly connected to said pointer, a sleeve supported by the carrier, an arm received in said sleeve, a parallel ruler connected in parallelism with said pointer and mounted at one end of said arm, means connecting said arm and said ruler so that the ruler is pivotable about an axis parallel to said ruler and intersecting said arm at a right angle and the connection between the carrier, said sleeve and said arm being such that the sleeve is pivotable about an axis parallel to said pointer, and said arm being pivotably and axially slideably received by said sleeve at a right angle to the pivot axis of said sleeve, whereby said ruler is adapted to be displaceable in parallelism with said pointer and always to adjust itself to lie flush on a map or other surface upon which the instrument housing rests.

References Cited in the file of this patent

UNITED STATES PATENTS

| | | |
|---|---|---|
| 224,962 | Sigsbee | Feb. 24, 1880 |
| 955,347 | Nevanas | Apr. 19, 1910 |
| 1,594,602 | Charlton | Aug. 3, 1926 |
| 1,826,375 | Van Buskirk | Oct. 6, 1931 |

FOREIGN PATENTS

| | | |
|---|---|---|
| 176,608 | Great Britain | Mar. 16, 1922 |